US012005544B2

(12) United States Patent
Regler et al.

(10) Patent No.: US 12,005,544 B2
(45) Date of Patent: Jun. 11, 2024

(54) MEASURING METHOD AND MEASURING SYSTEM FOR MEASURING DRILLED HOLES, AND PRECISION MACHINE TOOL WITH A MEASURING SYSTEM

(71) Applicant: KADIA Produktion GmbH + Co., Nürtingen (DE)

(72) Inventors: Roland Regler, Georgensgmünd (DE); Uwe Moos, Dettingen an der Erms (DE); Georg Heinle, Gomaringen (DE)

(73) Assignee: KADIA Produktion GmbH + Co., Nürtingen (DE)

( * ) Notice: Subject to any disclaimer, the term of this patent is extended or adjusted under 35 U.S.C. 154(b) by 668 days.

(21) Appl. No.: 17/126,320

(22) Filed: Dec. 18, 2020

(65) Prior Publication Data

US 2021/0190468 A1 Jun. 24, 2021

(30) Foreign Application Priority Data

Dec. 18, 2019 (DE) .......................... 102019220052.4

(51) Int. Cl.
*B24B 33/06* (2006.01)
*G01B 5/12* (2006.01)
(Continued)

(52) U.S. Cl.
CPC ................ *B24B 33/06* (2013.01); *G01B 5/12* (2013.01); *G01B 21/042* (2013.01); *G01B 21/047* (2013.01); *B23Q 17/20* (2013.01)

(58) Field of Classification Search
CPC . G01B 5/08; G01B 5/12; G01B 13/10; G01B 21/042; G01B 21/047; B24B 33/00;
(Continued)

(56) References Cited

U.S. PATENT DOCUMENTS 5,269,103 A  12/1993 Nagel et al.
5,571,222 A  11/1996 Ludwig
(Continued)

FOREIGN PATENT DOCUMENTS

CA  2113702 C  12/1996
CA  2303521 A1  9/2000
(Continued)

OTHER PUBLICATIONS

First Office Action dated Aug. 31, 2022 in connection with corresponding Chinese Patent Application No. 202011508942.2.

*Primary Examiner* — Benjamin R Schmitt
(74) *Attorney, Agent, or Firm* — Akerman LLP

(57) ABSTRACT

In the case of a method for measuring the geometry of a drilled hole in a workpiece, a measuring system is used which has a measuring unit with a measuring mandrel that can be moved bidirectionally along a travel path parallel to a measuring mandrel axis. The measuring mandrel is calibrated at least once with the use of a reference device by way of at least one reference element. During a measuring operation, the reference device is arranged in a neutral location outside the travel path of the measuring mandrel in such a way that the measuring mandrel can be introduced into the drilled hole without dipping through the reference element. To carry out a calibration operation, the reference device is moved out of the neutral location. The measuring mandrel is moved into a calibrating location, where a measurement for calibrating the measuring mandrel is carried out.

16 Claims, 7 Drawing Sheets

(51) Int. Cl.
*G01B 21/04* (2006.01)
*B23Q 17/20* (2006.01)
(58) Field of Classification Search
CPC ......... B24B 33/06; B24B 33/10; B23Q 17/20; B23Q 17/22
See application file for complete search history.

(56) References Cited

U.S. PATENT DOCUMENTS

| | | |
|---|---|---|
| 2014/0213148 A1 | 7/2014 | Gaegauf |
| 2014/0241820 A1 | 8/2014 | Berg et al. |

FOREIGN PATENT DOCUMENTS

| | | |
|---|---|---|
| CA | 2937592 A1 | 2/2017 |
| CN | 101279695 A | 10/2008 |
| CN | 101428363 A | 5/2009 |
| CN | 201287245 Y | 8/2009 |
| CN | 207963767 U | 10/2018 |
| DE | 41 23 598 A1 | 1/1993 |
| DE | 44 13 645 A1 | 10/1995 |
| DE | 100 60 967 B4 | 5/2006 |
| DE | 10 2013 223 986 A1 | 5/2015 |
| DE | 10 2006 011 904 B4 | 9/2017 |
| JP | 2009012163 A | 1/2009 |

MEASURING METHOD AND MEASURING SYSTEM FOR MEASURING DRILLED HOLES, AND PRECISION MACHINE TOOL WITH A MEASURING SYSTEM

CROSS-REFERENCE TO RELATED APPLICATIONS

This application claims priority to German Patent Application DE 10 2019 220 052.4 filed Dec. 18, 2019, the entirety of which is incorporated herein by reference.

FIELD OF APPLICATION AND PRIOR ART

The invention relates to a measuring method for measuring the geometry of a drilled hole, to a measuring system which is suitable for carrying out the measuring method, and to a precision machine tool with a measuring system of this type.

One preferred field of application is the measurement-assisted precision machining of drilled holes by way of internal honing, a measurement for determining the macroscopic shape of the drilled hole, in particular a measurement of the internal diameter of the drilled hole, being carried out before and/or after the precision machining.

Honing is a machining method with geometrically undefined blades, in the case of which a honing tool carries out a cutting movement which consists of two components, and there is continuous surface contact between one or more cutting material bodies, for example machine hones, of the honing tool and the drilled hole inner surface which is to be machined. The kinematics of a honing tool is characterized by a superimposition of a rotational movement and a linear movement which runs in the axial direction of the drilled hole. An optional expanding movement is usually also provided which leads to a change in the effective diameter of the honing tool.

The kinematics of the honing tool produce a surface structure with crossing toolmarks on the drilled hole inner surface. Surfaces which are finally machined by way of honing can satisfy extremely high requirements with regard to dimensional and shape tolerances. Therefore, many highly loaded sliding faces in engines or engine components, for example cylinder lining surfaces in engine blocks or drilled hole inner surfaces in housings of injection pumps, are machined by way of honing.

In the case of honing, very narrow tolerance specifications with regard to the macroscopic shape and the size of the drilled hole which is quantified, for example, by way of the drilled hole diameter are as a rule to be maintained. Measurement of the geometry of the drilled hole with the aid of a measuring system after completion of the honing process as a rule determines whether the desired macroscopic shape has been achieved by way of a honing process within the context of the tolerances. The measuring system which is used to this end can be integrated into the precision machine tool, or can be a constituent part of a measuring station which is separate from the precision machine tool.

Measuring systems which are known for this purpose comprise a measuring unit which, in the state which is set up ready for operation, has a measuring mandrel which can be moved to and fro parallel to a measuring mandrel axis by means of a linear drive. During measuring operation, the measuring mandrel can be moved into the drilled hole and subsequently out of the drilled hole again with the aid of the linear drive in order to carry out the measurement. During the measurement, different measuring planes can be moved to as required with the aid of the linear drive. The measuring mandrel is as a rule coupled replaceably to a measuring mandrel connector at the workpiece-side end of a measuring mandrel carrier which is mounted on a slide which can be moved parallel to the measuring mandrel axis. The coupling can be rigid, or possibly also movable to a limited extent, for example in a cardanic or floating manner.

The measuring mandrel can be, for example, a pneumatic measuring mandrel. Pneumatic measuring mandrels frequently have at least one pair of measuring nozzles which are arranged at a diametrical spacing from one another in relation to the measuring mandrel axis. There are also variants with only one measuring nozzle. A measuring nozzle can be understood to be a measuring point of a pneumatic measuring system. Tactilely operating measuring mandrels or measuring mandrels with one or more inductive or capacitive sensors or radar sensors are also known.

In order to prevent measurement errors, measuring systems are as a rule calibrated from time to time with the aid of a reference device. The reference device comprises at least one reference element of defined internal dimensions, for example one or more reference rings with an exactly known internal diameter. Reference rings of this type are frequently also called measuring rings, zero rings, gauge rings or calibration rings. For calibration purposes, the measuring mandrel is moved into the region of the reference device in such a way that the (known) internal diameter of the reference element can be measured by way of the measuring mandrel. In the case of intolerable deviations between the measured value and the (known) internal diameter, corrections can be performed.

During normal measuring operation, the measuring mandrel and the reference device are usually arranged coaxially with respect to one another, with the result that the reference device is positioned in the vicinity of the drilled hole inlet when the drilled hole is situated in the measuring position. The coaxial arrangement is considered to be advantageous because the measuring mandrel has to be moved merely axially (parallel to the measuring mandrel axis) for the purpose of the calibration, in order to change between the working location (measuring sensors within the drilled hole) and the calibrating location (measuring sensors in the region of the reference device).

Patent Specification DE 100 60 967 B4 describes examples, in the case of which reference rings consist of the material of the workpiece to be measured, in order to avoid temperature-induced calibrating errors.

DE 44 13 645 A1 describes examples, in which a reference gauge with a variable reference dimension is used. In order to calibrate the latter, the reference gauge can be moved perpendicularly with respect to the measuring mandrel axis into a gauge station which has a group consisting of a plurality of zero rings of different defined fixed internal diameters. In the gauge station, the variable reference gauge can be calibrated via a comparison with the zero rings.

Problem and Solution

It is one problem of the invention to provide a measuring method for measuring the geometry of a drilled hole, and a measuring system which is suitable for carrying out the measuring method, which method and system operate without disruptions, permanently provide high measuring accuracies, and, during operation, make dynamic measurement and therefore short machine cycle times of a precision machine tool which is equipped therewith possible.

In order to solve said problem, the invention provides a measuring method with the features of claim 1 and a measuring system with the features of claim 5. Furthermore, a precision machine tool with the features of claim 16 is provided. Advantageous developments are specified in the dependent claims. The wording of all the claims is made the content of the description by way of reference.

The measuring method serves to measure the geometry of the drilled hole in a workpiece. Here, in particular, the internal diameter of the drilled hole can be measured in a plane which lies perpendicularly with respect to the drilled hole axis, or in a plurality of planes which are offset axially with respect to one another. As an alternative to the measurement in fixed measuring planes, for example, continuous detection of the measured values over the entire drilled hole length (what is known as scanning) is also possible. In order to carry out the measuring method, a measuring system is used which has a measuring unit which, in the state which is set up ready for operation, has a measuring mandrel which can be moved to different axial positions bidirectionally along a travel path parallel to a measuring mandrel axis by means of a linear drive.

In order to prevent measuring errors as far as possible, the measuring mandrel is calibrated at least once with the use of a reference device by way of at least one reference element of defined internal dimensions. For calibration purposes, the measuring mandrel is moved by means of the linear drive into a calibrating location, in which at least one measuring sensor of the measuring mandrel is arranged in the region of the reference element. In the case of a pneumatic measuring system, a measuring nozzle is that part of the measuring sensor which interacts with the drilled hole inner surface at a measuring point, with the result that, in this case, the (at least one) measuring nozzle is arranged in the region of the reference element. Here, for example, the internal diameter or another internal dimension of the reference element can then be measured. If the measured value does not coincide with the known comparison dimension of the reference element within the tolerances, the measuring system can be corrected.

In accordance with one formulation of the claimed invention, it is provided that, during measuring operation of the measuring system, the reference device is arranged in a neutral location outside the travel path of the measuring mandrel in such a way that the measuring mandrel can be introduced into the drilled hole to be measured without dipping through the reference element. The reference device is moved, in order to carry out a calibration operation, out of the neutral location into a calibrating location, in which the reference element is arranged in a calibration position coaxially with respect to the measuring mandrel axis. The measuring mandrel is then moved with the aid of the linear drive into a calibrating location, in which at least one measuring sensor of the measuring mandrel is arranged in the region of the reference element. In the said calibrating location, a calibration measurement for calibrating the measuring mandrel is carried out. A calibration measurement is a measurement, the measured result of which is utilized for the calibration. A single calibration measurement can be sufficient for the complete calibration. Two or more calibration measurements are frequently carried out on one reference element or a plurality of reference elements, the measured results of which are processed jointly within the context of a calibration or are utilized for calibration.

During measuring operation, the workpiece with the drilled hole to be measured is positioned in a measuring position in such a way that the drilled hole axis of the drilled hole to be measured lies as coaxially as possible with respect to the measuring mandrel axis. The measuring mandrel can then dip into the drilled hole, can perform the measurement of the geometry of the drilled hole in one or more planes, possibly in a scan mode, and can subsequently be withdrawn again, with the result that another drilled hole of the same workpiece or a drilled hole in another workpiece can be measured afterwards.

The movement of the reference device between the neutral location and the calibrating location and back is preferably carried out automatically, that is to say with the aid of a drive which is provided for this purpose and can be actuated via a control unit. A manual operation for changing between the neutral location and the calibrating location is also possible.

The reference element is preferably a reference element with a fixedly predefined diameter, that is to say is not a reference element with adjustable internal dimensions. In the case of the use of reference elements with fixed internal dimensions, a separate gauge operation can be dispensed with, as is proposed from the prior art in the case of the use of adjustable reference elements. The reference element is preferably a reference ring, that is to say a reference element which is closed in the circumferential direction and can also be called a measuring ring. Instead of measuring rings, it is also possible, for example, to combine a plurality of gauge blocks (very precisely produced spacer pieces of known height) with what are known as gauge block holders/gauge block stands, in such a way that two parallel planes exist at a fixed spacing, which parallel planes might be utilized to calibrate a measuring mandrel, for example a pneumatic measuring mandrel with two measuring nozzles.

Since the reference device can be moved for the measuring operation out of the calibrating location into a neutral location outside the travel path of the measuring mandrel, an advantage arises that the measuring mandrel no longer has to dip through the reference element or the reference elements, in order to dip into the drilled hole. In this way, the measuring mandrel can be designed to be shorter and/or geometrically simpler in some other way than in the case of a permanent arrangement of reference elements in the travel path of the measuring mandrel.

In the case of the use of pneumatic measuring mandrels, a further advantage arises that the air volume which is enclosed and moved for the measurement between a measuring nozzle (that is to say, that part of the measuring sensor which is in interaction with the drilled hole inner side) and the associated measuring transducer (which converts pressure changes, volumetric flow changes or the like into electric signals) can be smaller, the shorter the configuration of the measuring mandrel. This reduced air volume can lead to shorter dead times in the measuring system, as a result of which shorter cycle times for the measurement and the associated manufacturing processes can be realised. Shorter cycle times of the measurement in turn improve the economic efficiency of the manufacturing process.

In the case of conventional measuring systems, in which the reference device is always mounted statically at a fixed height between the plane of the workpiece to be measured and the measuring mandrel connector, the measuring mandrel has to have a length such that it can dip through the reference device with the reference elements (one or more). This means, as described above, that the measuring mandrels have to be of relatively long configuration. In order to limit the length, furthermore, the reference device should be positioned relatively close above the upper side of the workpieces to be measured. As a result, the said arrangement becomes relatively inflexible, since larger (higher) workpieces might cause a collision with the reference device. If, in contrast, the reference device were mounted at a higher location, in order to maintain more clearance above the plane of the workpieces, workpieces with a lower height might possibly no longer be measured. These problems are avoided in the case of the use of the invention.

The reference device is preferably moved automatically from the calibrating location back into the neutral location after completion of the calibration operation, before the measuring operation is resumed.

In accordance with one development, in the neutral location, the reference device is received in a housing which encloses the reference device at least partially. Accordingly, the measuring system has a housing for receiving the reference device in the neutral location, the housing enclosing the reference device at least partially in the neutral location, and it being possible for the reference device to be moved out of the housing into the calibrating location. Protection of the reference elements (one or more) contained in the reference device against contamination and/or damage can be achieved by way of the provision of a housing, in which the reference device is received at least partially in the neutral location. This takes into consideration that the reference elements are intended to serve as calibration standards for the measuring mandrel and should therefore be accommodated in a manner which is as protected as possible when they are not required during the measuring operation.

For the change between the neutral location and the calibrating location, for example, the reference device can be displaced in a linear manner in a displacement direction which runs perpendicularly with respect to the measuring mandrel axis. This can be achieved structurally by virtue of the fact that the reference device is guided in the manner of a drawer such that it can be moved in a linear manner into the housing and out of the housing. As an alternative, for example, it is possible to mount the reference device pivotably, for example about a pivot axis which runs parallel to the measuring mandrel axis. Lateral pivoting in parallel to the measuring mandrel axis or pivoting in from above with a parallelogram guide are possible, for example.

In accordance with one development, the reference device has a movably mounted load-bearing frame with receiving structures for receiving an exchangeable reference element carrier. The reference device can be changed over simply to different calibrating dimensions by way of the exchange of the reference element carrier with one or more reference elements which are received therein. It is preferably provided that the reference element carrier is exchangeable without tools, that is to say without the aid of tools. As a result, a changeover to different calibrating dimensions can be performed comfortably and rapidly by way of an operator.

A reference element carrier which can be substituted or exchanged can have receiving structures for a single reference element. The reference element carrier preferably has receiving structures for receiving two or more reference elements in a coaxial arrangement. It is possible as a result to compare the measuring mandrel with at least two different internal dimensions or calibration gauges in the case of the calibration operation. Therefore, the results of two or more calibration measurements can be processed jointly. The measured values which are obtained can be used, for example, for interpolation to dimensions which lie in between. As a result, highly precise calibrations are possible.

It is provided in accordance with one development that components of the measuring system are fastened to a load-bearing structure, the measuring unit having a slide which is guided on a linear guide system such that it can be displaced in a linear manner on a main carrier which is fastened to the load-bearing structure, the main carrier supporting the linear drive. In this way, all of the components which are supported by the main carrier, in particular the measuring unit which can be moved in a bidirectional manner or to and fro on a linear guide system and the linear drive which is required for the production of the said movement, can be attached jointly as an assembly to a load-bearing structure and can be removed from the latter.

The abovementioned housing which receives the reference device at least partially in its neutral location is preferably also fastened to the main carrier. This can firstly achieve a situation where the reference device can also be installed jointly with the assembly. Moreover, the housing and the reference device are then always situated in the correct position and orientation with respect to the measuring mandrel axis. The assembly which can be preassembled completely and can be mounted on the load-bearing structure can also be called a "measuring axis", the "measuring axis" being a dedicated machine axis, the operations of which can be controlled via the control unit of a separate measuring station or a precision machine tool.

In order to avoid or minimize measuring errors which result from faulty orientations between the measuring mandrel axis and the drilled hole axis of the drilled hole to be measured, an orientation system is provided in the case of some embodiments for the infinitely variable, reversible setting of the orientation of the measuring mandrel axis in relation to the load-bearing structure. The orientation system is preferably configured for the independent setting of the location of the measuring mandrel axis along two translational axes which are perpendicular with respect to one another, and for the setting of the orientation of the measuring mandrel axis in relation to two rotational axes which are perpendicular with respect to one another.

It can be provided, in particular, that the orientation system has a first setting unit and a second setting unit which is separate from the first setting unit, can be actuated separately, and is arranged at a spacing from the first setting unit, each of the setting units having first setting elements for the infinitely variable adjustment of a spacing between the load-bearing structure and the main carrier in a first direction, and second setting elements for the production of an infinitely variable relative movement of the main carrier with respect to the load-bearing structure in a second direction which is perpendicular with respect to the first direction. In order to facilitate the mounting and also for reasons of improved stability, the two setting units can be installed on a common main body.

In the case of some embodiments, the measuring mandrel can be moved in a linear manner parallel to the measuring mandrel axis exclusively with the aid of the linear drive, but is otherwise not movable. There are also embodiments, in the case of which the measuring mandrel can additionally be rotated about the measuring mandrel axis with the aid of a rotary drive. Via the rotary drive, it is possible to carry out measurements, for example measurements of the internal diameter of a drilled hole, in any desired radial directions with respect to the drilled hole axis.

The invention also relates to a precision machine tool for the precision machining of a drilled hole in a workpiece, the precision machine tool being assigned a measuring system in accordance with the invention. The measuring system can be integrated into the precision machine tool, or can be a constituent part of a measuring station which is separate from the precision machine tool.

The precision machine tool can be, in particular, a honing machine. A honing machine is a machine tool which is suitable for honing drilled holes in workpieces. It has at least one honing unit which is mounted on a load-bearing structure which is fixed on the machine, for example a stand, a pillar or a frame. A honing unit comprises a spindle unit, in which a spindle shaft is mounted rotatably. The spindle shaft can be rotated about its spindle axis by means of a rotary drive, and has a device for fastening a honing tool at one tool-side end. A linear guide system for guiding a linear movement of the spindle unit with respect to the main carrier can be arranged between the main carrier and the spindle unit. In order to generate the linear movement of the spindle unit parallel to the spindle axis, a linear drive is provided. Moreover, an expanding drive for expanding the honing tool is as a rule provided.

The honing machine can have a plurality of workstations, for example two or more honing stations with in each case at least one honing unit. Mechanical components of the measuring system, in particular the measuring unit, the reference device, possibly a housing for receiving the reference device in the neutral location, etc., can be mounted at a suitable location on the load-bearing structure, with the result that a honing machine with an integrated measuring station is produced.

BRIEF DESCRIPTION OF THE DRAWINGS

Further advantages and aspects of the invention result from the claims and from the following description of preferred exemplary embodiments of the invention which are described in the following text on the basis of the figures, in which:

DETAILED DESCRIPTION OF THE EXEMPLARY EMBODIMENTS

In the following text, exemplary embodiments of measuring methods and measuring systems for measuring the geometry of drilled holes in workpieces will be described in conjunction with a measuring station which is assigned to a precision machine tool (not shown) in the form of a honing machine. The measuring system 100 which is described in greater detail in the following text can be integrated into the precision machine tool as a measuring station. As an alternative, for example, the measuring system can be a constituent part of a measuring station which is separate from the precision machine tool.

Figure 1:
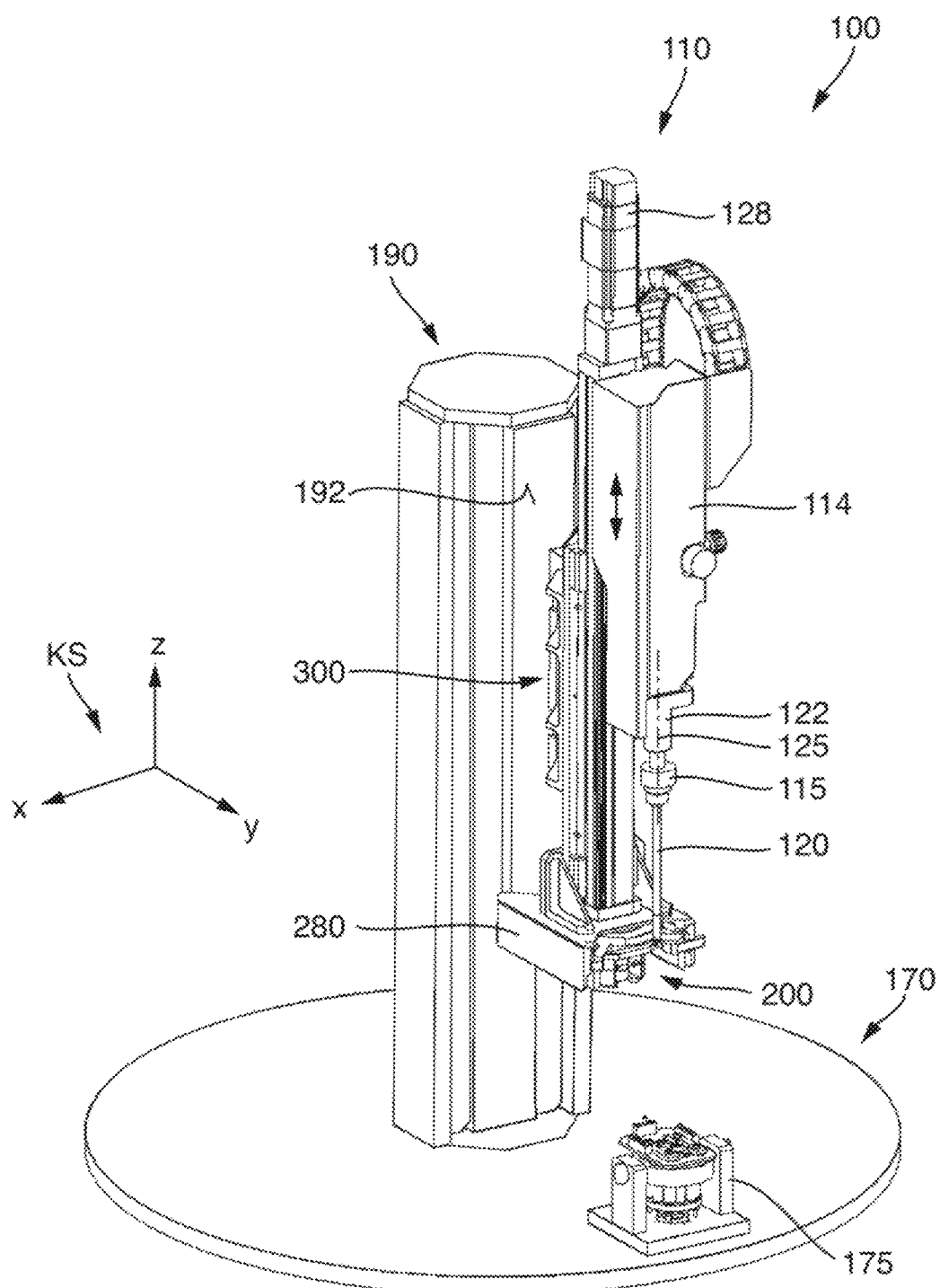
FIG. 1 diagrammatically shows a measuring station with components of a measuring system in accordance with one exemplary embodiment.

FIG. 1 diagrammatically shows a measuring station with components of a measuring system 100 in accordance with one exemplary embodiment. A large number of mechanical components of the measuring system 100 are attached to a load-bearing structure 190 in the form of a vertical stand. The load-bearing structure can be a component which is connected in a mechanically fixed manner to the machine frame of the precision machine tool, or the load-bearing structure of a separate measuring station. The load-bearing structure 190 in general extends vertically or parallel to the z-direction of the Cartesian system coordinate system KS. Mechanical components of the measuring system 100 are fastened to the front side 192 (lying in the y-direction) of the load-bearing structure in such a way that the components lie above a workpiece plane.

The workpieces, the drilled holes (one or more) of which are to be measured with the aid of the measuring system, are transported in the exemplary case for measurement and are transported away afterwards with the aid of a workpiece transport system 170. The workpiece which is not visible is received in a workpiece holding apparatus 175. FIG. 1 diagrammatically shows a workpiece transport system 170 with a rotary indexing table. Variants for the linear workpiece transfer are also possible. A workpiece can also be moved manually into the measuring position.

The measuring system 100 comprises a vertically oriented measuring unit 110 which, in the illustrated state which is set up ready for operation, has an (exchangeable) measuring mandrel 120 which can be moved to and fro or up and down parallel to a measuring mandrel axis 125 along a substantially vertical travel path with the aid of a linear drive 128. All the vertical movements are controlled via the electric linear drive 128 with the aid of a control unit (not shown) of the measuring station. The said linear drive 128 drives a vertically oriented ball bearing spindle, on which a spindle nut runs which is connected to vertically movable parts of the measuring unit 110.

Figure 2:
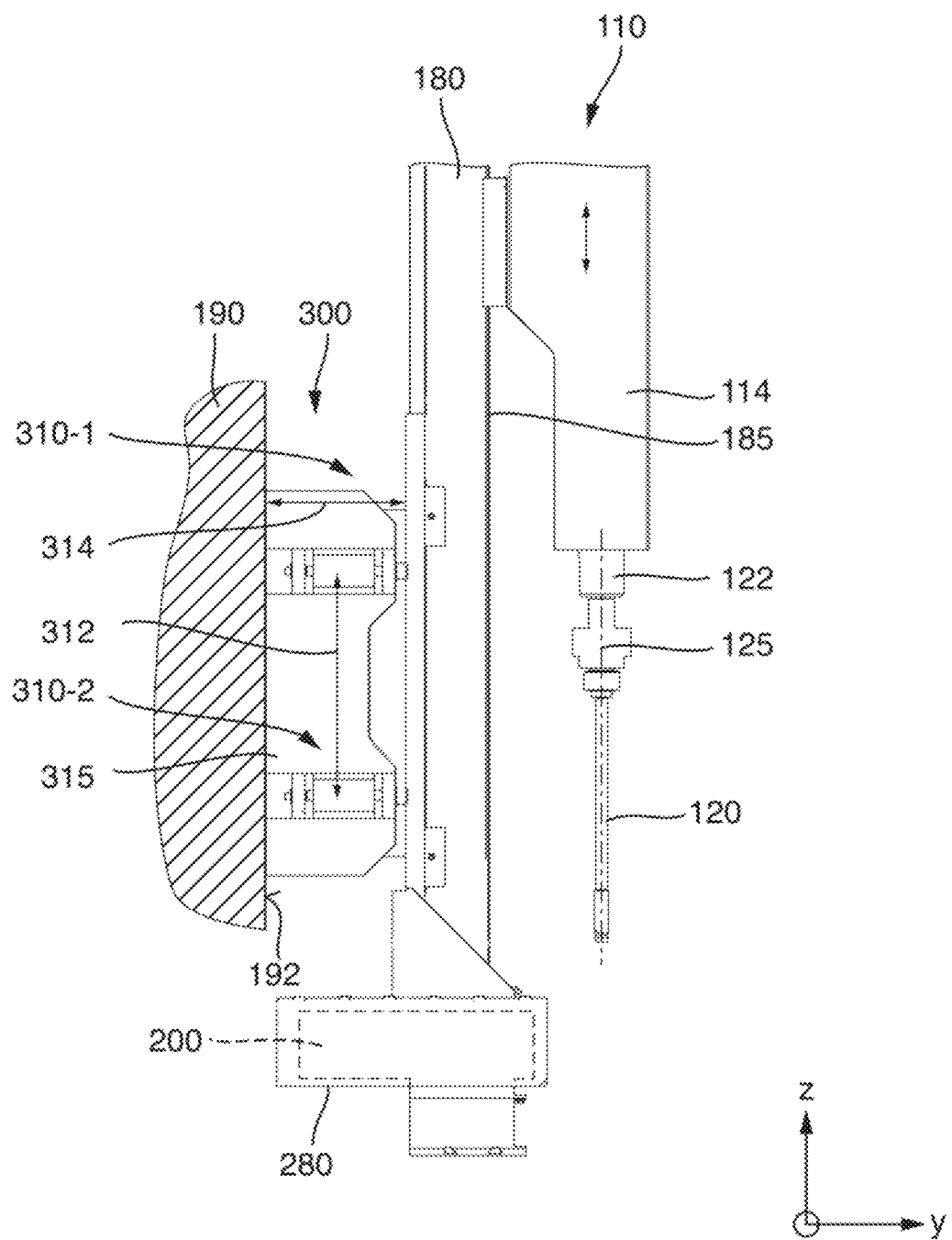
FIG. 2 shows further details of the construction from FIG. 1.

Further details of the construction can be seen in the diagrammatic side view of FIG. 2. Mechanical components of an orientation system 300 which is described later are mounted on the planar front side 192 of the load-bearing structure 190. On the side which faces away from the load-bearing structure, the said orientation system 300 supports a generally vertically oriented main carrier 180, which is a torsionally rigid component which supports vertically running guide rails of a linear guide system 185 on the side which faces away from the load-bearing structure 190.

The measuring unit 110 has a slide which can be moved substantially vertically on the linear guide system. The spindle nut of the ball bearing spindle is fastened to the slide, with the result that a vertical movement of the measuring unit 110 can be produced in both directions with the aid of the linear drive 128. The linear drive 128 is fastened to the upper end of the main carrier 180. The ball bearing spindle runs within the main carrier 180.

The measuring unit 110 comprises a measuring mandrel carrier 122 which protrudes at the lower end out of a housing 114 of the measuring unit. Coupling structures of a measuring mandrel connector 115 are situated on the measuring mandrel carrier 122. The measuring mandrel connector can be of sprung configuration for the purpose of anti-collision protection. The measuring mandrel 120 is coupled exchangeably to the said measuring mandrel connector at the workpiece-side end of the measuring mandrel carrier, for example by means of a union nut or a bayonet coupling. The coupling can be rigid, but can possibly also be configured such that it can be moved to a limited extent, with the result that the measuring mandrel 120 can also be mounted on the measuring mandrel carrier in a cardanic and/or floating manner. Depending on the coupling type, the longitudinal centre axis of the measuring mandrel can always run parallel to the axis of the measuring mandrel carrier or, in the case of cardanic suspension, can be set slightly obliquely (by a few degrees) with respect thereto in phases.

In the exemplary case, the measuring mandrel 120 is a pneumatic measuring mandrel. The latter has, in the lower end region, at least one pair of measuring nozzles which are arranged at a fixed spacing from one another so as to lie diametrically opposite one another in relation to the measuring mandrel axis. There are also, for example, measuring mandrels with three measuring nozzles (for example, in the case of parts with transverse bores split into three), four-nozzle measuring mandrels (no influence of an ovality as a result) and mandrels with six or eight measuring nozzles (for example, in the case of very narrow webs). In all cases, the measured value at the measuring mandrel corresponds to the mean value of the respective spacings of the measuring nozzles from the workpiece surface.

Pneumatic measuring mandrels operate in accordance with the nozzle/baffle plate principle as is known. For the measurement, compressed air is blown out of the measuring nozzles in the direction of the drilled hole wall. The resulting back pressure in the region of the measuring nozzles serves as a measure of the spacing of the measuring nozzle from the drilled hole wall. A measuring transducer which is connected to the measuring nozzle via a pressure line ensures a conversion of the (pneumatic) pressure signal into a signal which can be processed further electrically. In the case of a given diametric spacing between the measuring nozzles, the drilled hole diameter can be determined by means of two measuring nozzles which lie diametrically opposite one another. The measuring transducer and a line system for the compressed air feed are accommodated within the housing 114 of the measuring unit together with further components. The position of a measuring nozzle is considered here to be an effective position of the measuring sensor. Annular nozzles or slot nozzles are further modifications of more traditional round nozzles.

In the case of one embodiment (not shown), the measuring mandrel can additionally be rotated about the measuring mandrel axis with the aid of a rotary drive. Via the rotary drive, it is possible to carry out measurements in any desired radial directions of the drilled hole to be measured temporally after one another. In this case, the measuring mandrel carrier is designed as a rotatable spindle, and the rotary drive can be attached within the housing.

In order to avoid measuring errors as far as possible, measuring systems should be calibrated from time to time. To this end, the measuring system 100 has an integrated reference device 200 for the calibration of the measuring mandrel 120. The mechanical components of the reference device can be seen particularly clearly in FIGS. 3, 4A, 4B and FIG. 6. The reference device 200 is not mounted in a stationary manner in relation to the load-bearing structure 190, but rather is mounted such that it can be moved in a linear manner in a displacement direction 205 (corresponding to the y-direction of the system coordinate system KS) which runs perpendicularly with respect to the measuring mandrel axis. The reference device can be moved with the aid of a pneumatic drive (not shown) between the neutral location which is shown in FIG. 1 and the calibrating location which is shown, for example, in FIG. 3 and FIG. 5, in a horizontally parallel manner with respect to the y-direction.

In the neutral location (FIG. 1), the mechanical components of the reference device 200 are accommodated to a large extent within a box-shaped housing 280 which is mounted on the main carrier 180 at the lower end of the latter. The housing encloses the reference device in the neutral location towards the top and the sides in the manner of a drawer box. The reference device 200 itself is guided in the manner of a drawer such that it can be moved in a linear manner parallel to the y-direction into the housing 280 and out of the housing. To this end, horizontal guide structures are configured on the inner side of vertical housing walls. The reference device has a movably mounted load-bearing frame 210 which, on its outer side, has guide structures which run in the guide structures on the inner side of the housing 280.

Figure 4A:
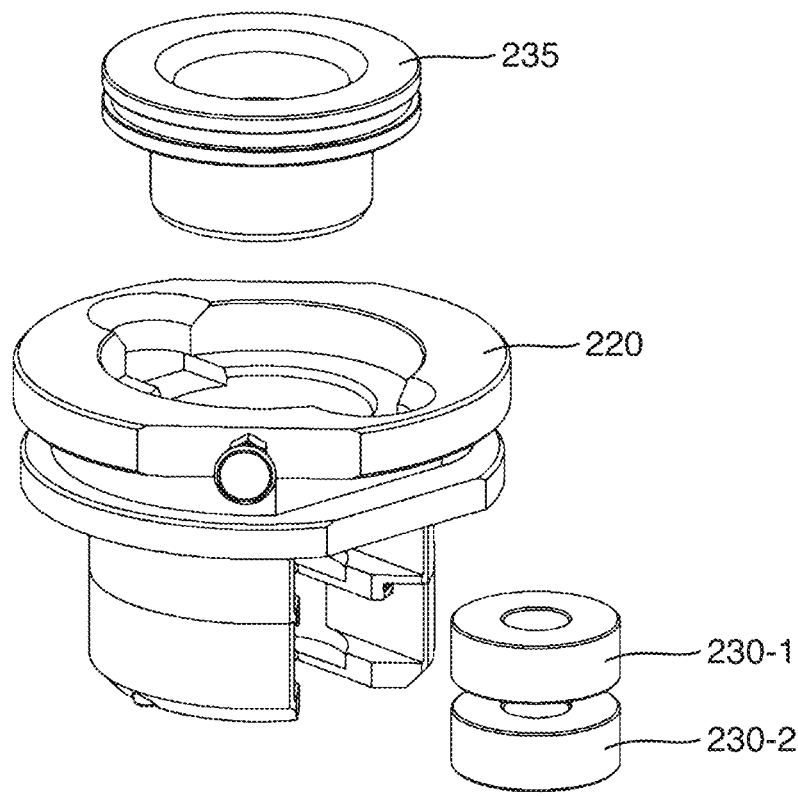
FIGS. 4A and 4B show an exchangeable reference element carrier which can be inserted into a load-bearing frame of the reference device and has receiving structures for reference rings.
Figure 4B:
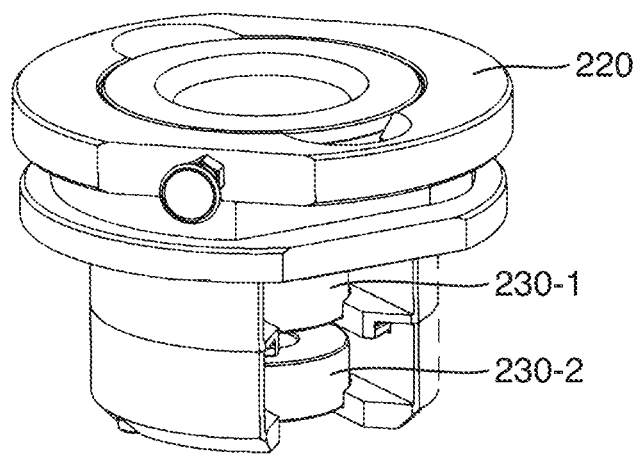
Figure 5:
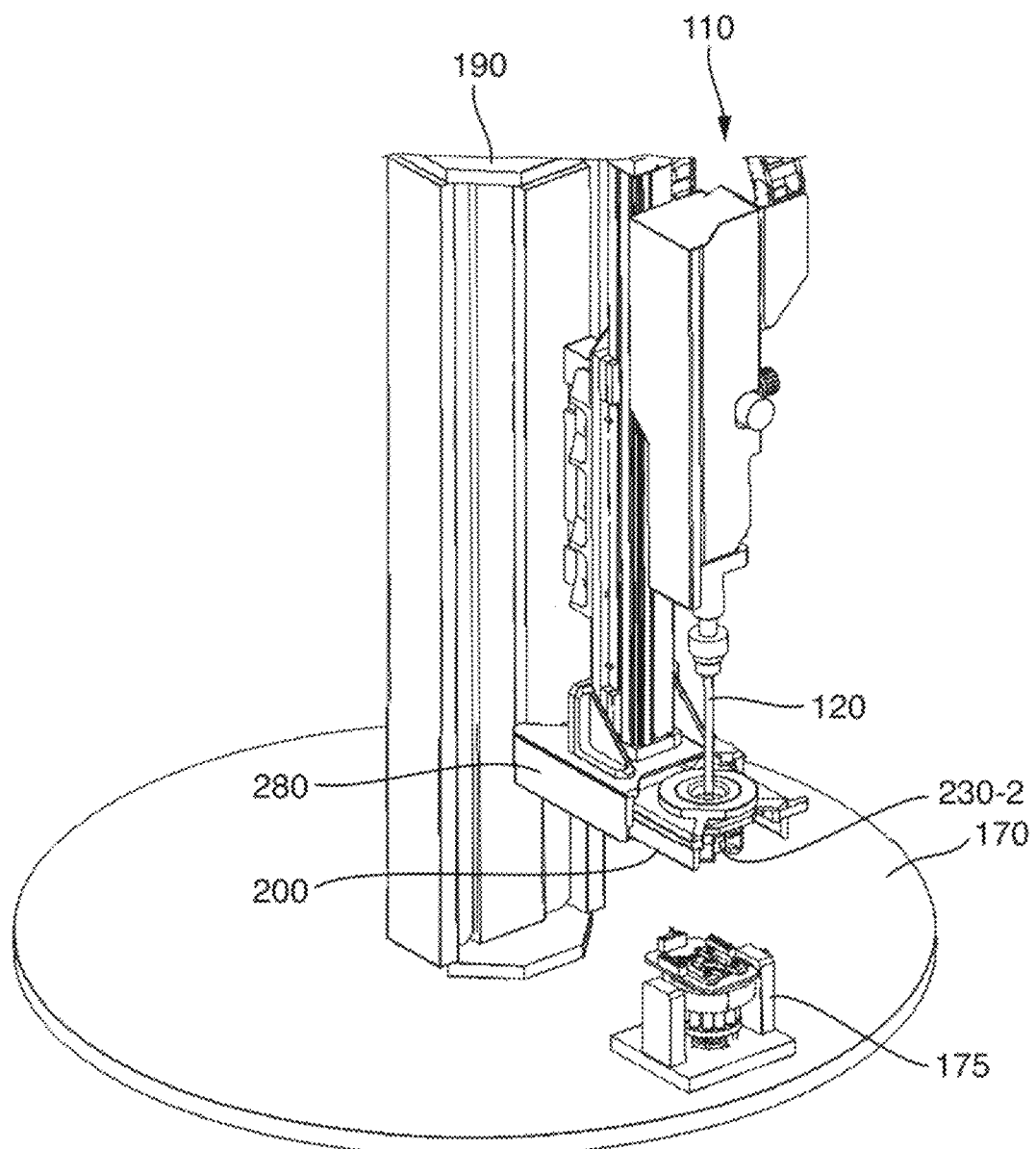
FIG. 5 shows the reference device in a calibrating location with an introduced measuring mandrel.
Figure 6:
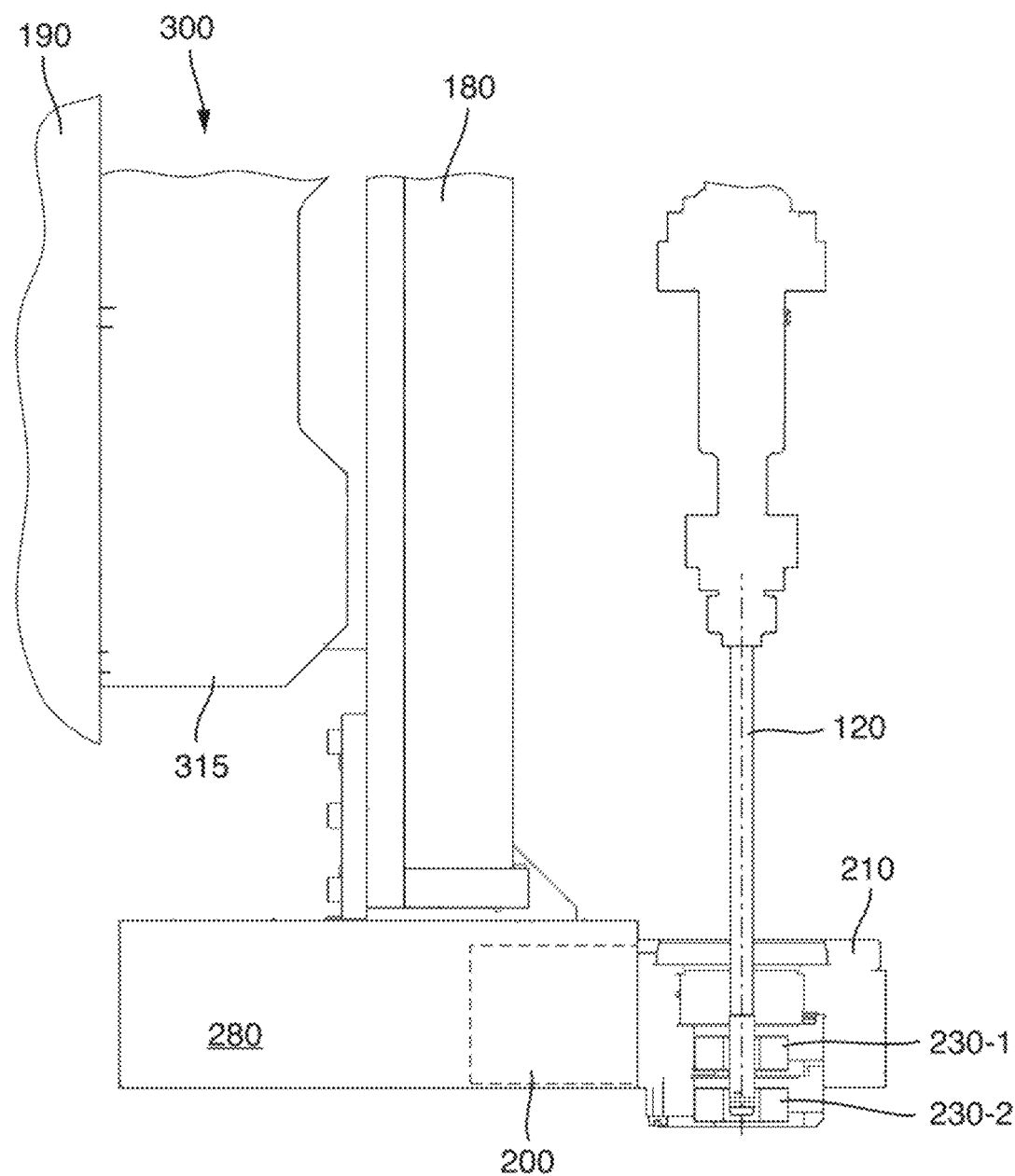
FIG. 6 shows the reference device in a calibrating location, measuring nozzles of the pneumatic measuring mandrel being arranged in the region of one of the reference elements.

The load-bearing frame 210 has receiving structures for receiving an exchangeable reference element carrier 220 which can also be seen clearly in FIGS. 4A and 4B. The reference element carrier 220 serves to receive a plurality of reference elements 230-1, 230-2 in the form of reference rings with a defined internal diameter. The reference element carrier has internal receiving structures, into which the reference rings can be pushed laterally and are then received in such a way that they are positioned in a coaxial arrangement there in a centred manner with respect to the centre axis of the reference element carrier (cf. FIG. 4B). A recessed cylindrical receptacle is configured on the upper side of the reference element carrier, into which receptacle an introduction aid 235 can be inserted from above. The introduction aid has conical insertion faces which prevent a collision of the measuring mandrel in the case of the introduction into the reference elements (reference ring).

The reference element carrier 220 which can receive two or more measuring rings is also called a measuring ring nest. The reference element carrier can be inserted into the load-bearing frame 210 and can be removed from the latter without the aid of tools. To this end, the load-bearing frame 210 is open in a funnel-like manner on the side which faces the measuring mandrel axis. The reference element carrier 220 can be pushed into and removed from its installation position in the load-bearing frame 210 horizontally in a defined rotational position. In the pushed-in state, it can be fixed and latched there by way of rotation by, for example, 45°. The illustration of FIG. 3 shows the reference element carrier in the latched state which is mounted ready for operation.

Figure 3:
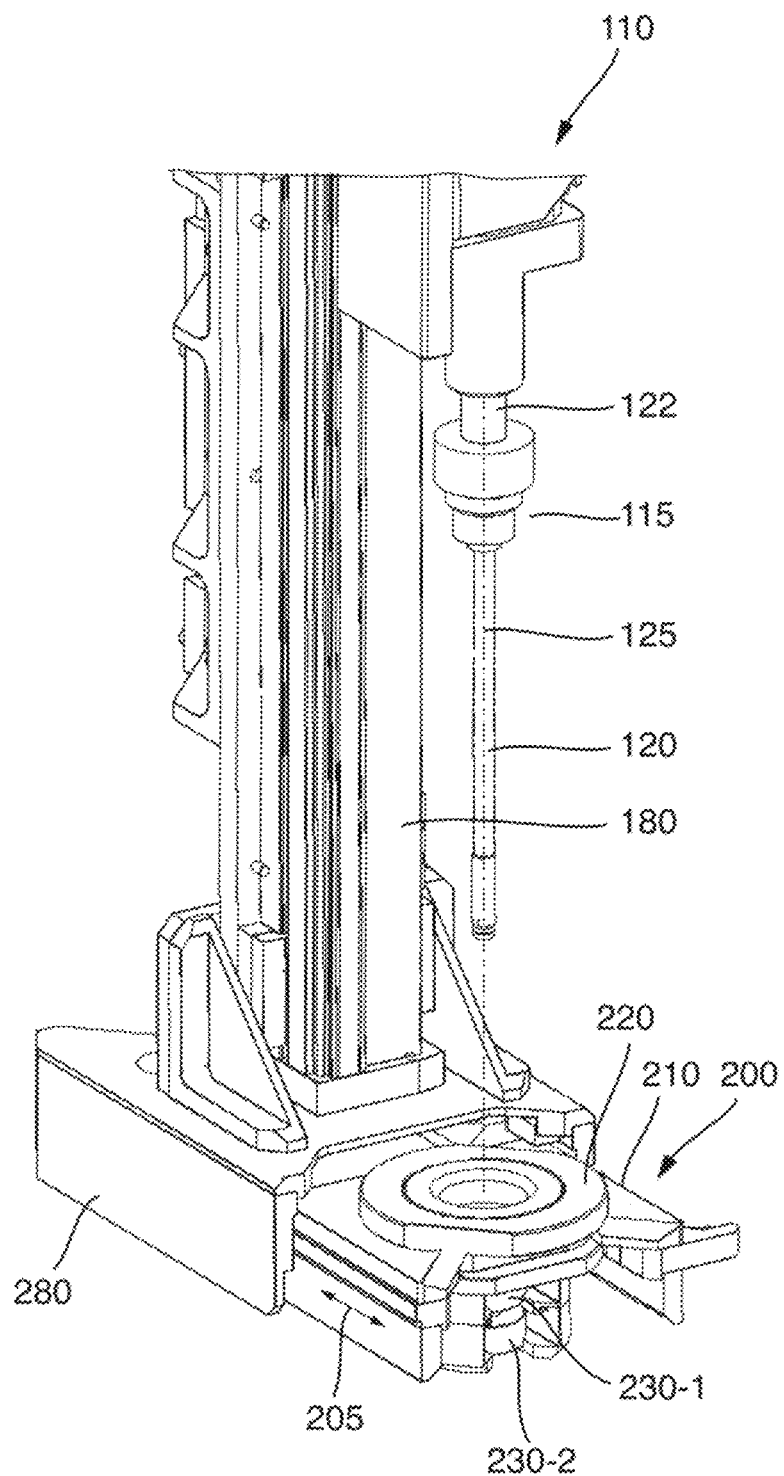
FIG. 3 shows the reference device in a calibrating location.
Figure 7:
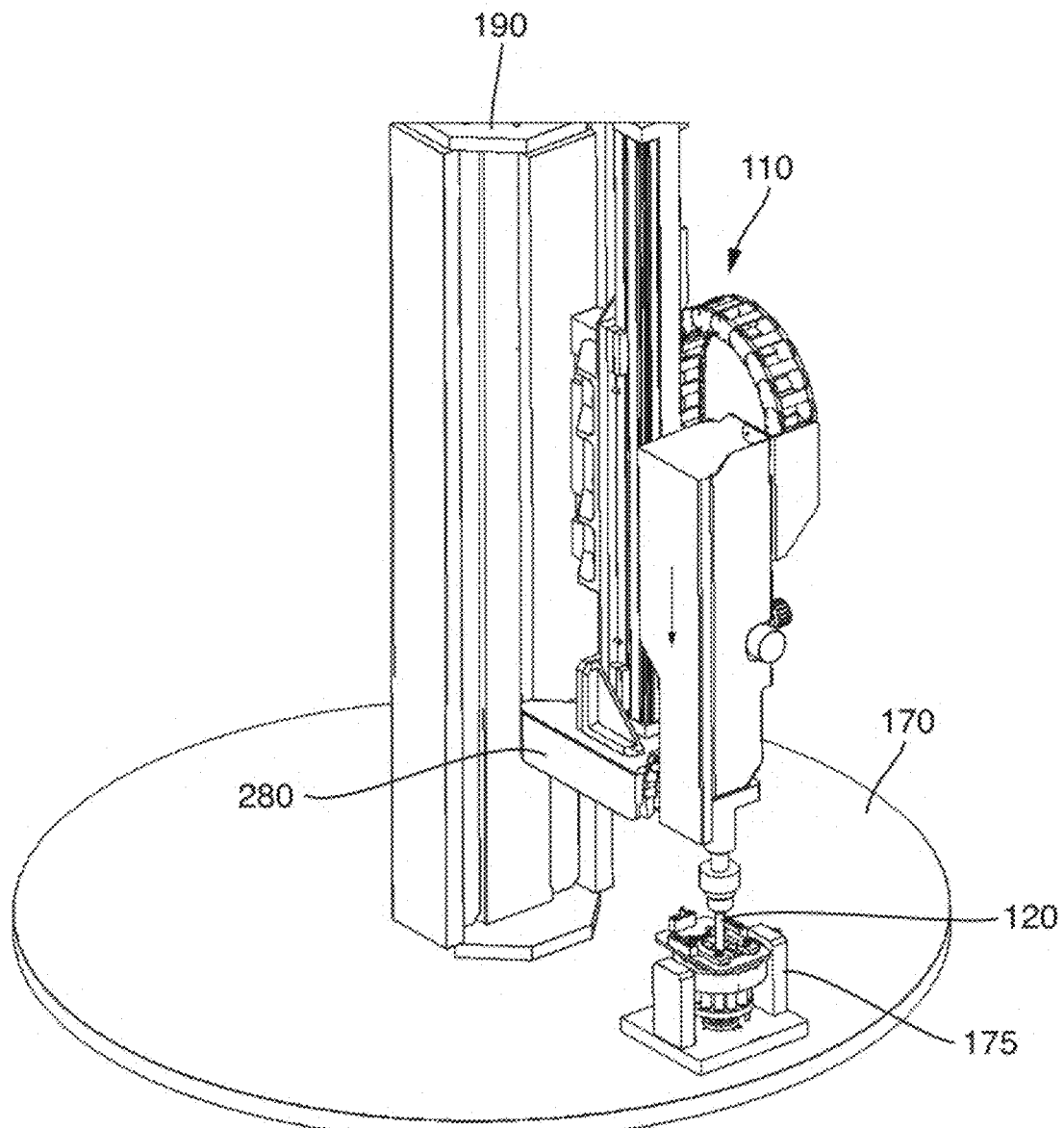
FIG. 7 shows the measuring mandrel in a measuring location.

As has already been mentioned, the reference device 200 can be moved in its entirety in a linear manner between the neutral location (partially in the interior of the housing 280) which can be seen in FIG. 1 and the calibrating location which is shown in FIG. 3. In the neutral location, the reference device is situated completely outside the vertical travel path of the measuring mandrel 120 and the housing, with the result that it can be introduced into a drilled hole to be measured without dipping through the reference device and/or the reference elements which are contained therein. The measuring mandrel connector 115 can be positioned if required at a level below the housing 280. This lower measuring location which the measuring unit can assume for the measuring operation is shown in FIG. 7. If a calibration of the measuring mandrel is to be performed, the measuring mandrel is moved upwards to such an extent that its lower end lies above the horizontal movement path of the reference device 200. The reference device can then be moved with the aid of the pneumatic drive horizontally into the calibrating location which is shown in FIG. 3. In the calibrating location, the reference elements are situated in their calibration position coaxially with respect to the measuring mandrel axis 125. As a result, the measuring mandrel can be moved with the aid of the linear drive 128 downwards into a calibrating location, in which a measuring sensor of the measuring mandrel (here, the measuring nozzles) is arranged in the region of one of the reference elements (cf. FIG. 6). The calibration can then be carried out with the aid of a measurement of the known internal diameter of the reference element.

Therefore, the measuring method is distinguished by the fact that the reference device 200 is situated in a neutral location outside the vertical travel path of the measuring mandrel during measuring operation, that is to say when the measuring mandrel 120 is used or is to be used for the measurement of drilled holes in workpieces, with the result that the measuring mandrel can be introduced into the drilled hole to be measured without dipping through the reference element.

In order to carry out a calibration operation, the reference device 200 is moved automatically out of the neutral location into the calibrating location, in which the reference element is situated in a calibration position coaxially with respect to the measuring mandrel axis 125. In order to avoid collisions with the measuring mandrel, the measuring unit 110 is previously pushed upwards at least to such an extent that that end of the measuring mandrel which faces the workpiece is situated above the plane of the upper side of the reference device 200. The measuring mandrel is then moved with the aid of the linear drive 128 downwards into a calibrating location, in which a measuring sensor of the measuring mandrel is arranged in the region of the reference element of interest, for instance at the level of the vertical centre of a measuring ring. A calibration measurement for the purpose of the calibration is then carried out in the said calibrating location.

A plurality of calibration measurements can be performed within the context of a calibration. For example, measurements can be carried out temporally one after another on two measuring rings of different internal diameters which are arranged offset axially with respect to one another, and the results can then be set off against one another.

After completion of the calibration operation, the measuring mandrel is moved upwards out of the reference device, and the reference device is automatically moved out of the calibrating location back into the neutral location, before the measuring operation is resumed.

In many cases, the calibration is a cyclical process which, depending on the application, takes place at a relatively broad, adjustable time interval. Calibration is typical, for example, after a machine is switched on, in the case of a shift change, and then, following this, at fixed time intervals, for example of from 0.5 hours to approximately 4 hours.

The measuring unit should fundamentally be oriented for the measuring operation in such a way that the measuring mandrel axis 125 runs coaxially with respect to a reference axis which, in the case of a workpiece which is situated in a measuring position, corresponds to the drilled hole axis of a drilled hole to be measured. In the case of the exemplary embodiment, this can be ensured systematically and relatively comfortably with the aid of the orientation system 300. The orientation system 300 comprises a first setting unit 310-1 and a second setting unit 310-2 which is separate from the first setting unit and is arranged at a spacing 312 from the first setting unit 310-1. The components of the setting units are installed on a common main carrier 315, which, inter alia, facilitates the mounting.

After the preassembly, the setting units are arranged for the rough orientation between the load-bearing structure 190 and the main carrier 180 of the measuring unit. Each of the setting units comprises first setting elements for the reversible adjustment of a spacing between the load-bearing structure and the main carrier in a first direction which corresponds to the y-direction, and second setting elements for the production of an infinitely variable relative movement of the main carrier with respect to the load-bearing structure in a second direction which is perpendicular with respect to the first direction and corresponds substantially to the x-direction. The setting units can be actuated independently of one another, which simplifies the setting work. An infinitely variable setting of the setting variables is preferably possible. If precisely two setting units are used, reliable setting of the target values can be achieved, without the overall arrangement being geometrically overdetermined, which might lead to a deformation of the devices which are coupled to the spindle unit.

Different positional changes of the measuring mandrel axis can be achieved via the setting of the spacing 314 between the load-bearing structure 190 and the main carrier 180 with the aid of the first setting elements. If the spacing is changed by an identical spacing dimension on the two setting units, this brings about a parallel shift of the measuring mandrel axis in the first direction (y-direction). If, in contrast, the spacing is changed merely on one of the setting units or the spacing dimension is changed on the two setting units by a different magnitude, this brings about tilting and/or rotation of the measuring mandrel axis about a rotational axis which is perpendicular to the first direction if it runs parallel to the second direction (x-direction). The position of the said virtual rotational axis in relation to the two setting units can vary, and is dependent on the absolute extent of the spacing changes on the two setting units and on the type of the spacing change (spacing increase or spacing decrease).

Similar setting possibilities result from the actuation of the second setting elements which bring about an infinitely variable relative movement of the main body with respect to the load-bearing structure in the two setting units in a second direction which is perpendicular with respect to the first direction. If a relative shift is brought about by the same displacement travel in the said second direction (x-direction) in the two setting units, this results in a parallel movement of the position of the measuring mandrel axis without a change in its inclination. If, in contrast, the displacement travels differ between the first setting unit and the second setting unit, this also results in a rotation of the measuring mandrel axis 125 about a (virtual) rotational axis which runs parallel to the first direction (y-direction). The absolute position of the said virtual rotational axis is also dependent here on the ratios of the displacement travels between the first setting unit and the second setting unit.

Up to now, exemplary embodiments of measuring methods and measuring systems for measuring the geometry of drilled holes in workpieces have been described in conjunction with a dedicated measuring station which is assigned to a precision machine tool in the form of a honing machine. There are also honing methods, in the case of which measuring sensors of a diameter measuring system are arranged on an expandable honing tool, for example measuring nozzles of a pneumatic measuring system. In this way, in-process measurements of the drilled hole can be carried out during its honing, for example in order to carry out a regulated honing process. It is possible to attach components of the measuring system with the reference device to a honing station which is normally used for workpiece machining and can be used for honing in machining operation. If the measuring system which is integrated into the honing tool is then to be calibrated, this calibration operation can take place at the honing station in an analogous manner with respect to the above-described procedure. The expandable honing tool would then be considered to be a measuring mandrel which, in addition to one or more measuring sensors, also supports one or more cutting material bodies which can be fed in radially, for example in the form of machine hones. For calibration purposes, the cutting material bodies should be fed into their radially inwardly withdrawn location, in order to avoid contact with reference elements.

It would therefore also be conceivable to use the drawer on a honing station which has a honing tool with measuring nozzles ("in-process measurement"). It would also be advantageous here that the honing tool can be designed to be as short and therefore precise as possible. In this case, the measuring rings would additionally be protected against damage by way of the honing tool and abrasion from the honing process by way of being moved out of the honing tool axis.

The invention claimed is:

1. A measuring method for measuring the geometry of a drilled hole in a workpiece with the use of a measuring system which has a measuring unit which, in the state which is set up ready for operation, has a measuring mandrel which can be moved bidirectionally along a travel path parallel to a measuring mandrel axis by means of a linear drive;
the measuring mandrel being calibrated at least once with the use of a reference device by way of at least one reference element of defined internal dimensions, by the measuring mandrel being moved by means of the linear drive into a calibrating location, in which a measuring sensor of the measuring mandrel is arranged in the region of the reference element, wherein, during measuring operation, the reference device is arranged in a neutral location outside the travel path of the measuring mandrel in such a way that the measuring mandrel can be introduced into the drilled hole to be measured without dipping through the reference element;
the reference device is moved, in order to carry out a calibration operation, out of the neutral location into a calibrating location, in which the reference element is arranged in a calibration position coaxially with respect to the measuring mandrel axis;
the measuring mandrel is moved by means of the linear drive into a calibrating location, in which a measuring sensor of the measuring mandrel is arranged in the region of the reference element;
and, in the calibrating location, a calibration measurement for calibrating the measuring mandrel is carried out.

2. The measuring method according to claim 1, wherein movements of the reference device between the neutral location and the calibrating location and back are carried out automatically, the reference device, in particular, being moved automatically out of the calibrating location back into the neutral location after completion of the calibration operation, before the measuring operation is resumed.

3. The measuring method according to claim 1, wherein, in the neutral location, the reference device is received in a housing which encloses the reference device at least partially.

4. The measuring method according to claim 1, wherein, for the change between the neutral location and the calibrating location, the reference device is displaced in a linear manner in a displacement direction which runs perpendicularly with respect to the measuring mandrel axis.

5. A measuring system for measuring the geometry of a drilled hole in a workpiece comprising:
a measuring unit which, in the state which is set up ready for operation, has a measuring mandrel which can be moved bidirectionally along a travel path parallel to a measuring mandrel axis by means of a linear drive;
a reference device for calibrating the measuring mandrel, the reference device having at least one reference element of defined internal dimensions, wherein the reference device is mounted movably in such a way that the reference device can be moved between a calibrating location and a neutral location, the reference element being arranged, in the calibrating location, in a calibration position coaxially with respect to the measuring mandrel axis in such a way that the measuring mandrel can be moved by means of the linear drive into a calibrating location, in which a measuring sensor of the measuring mandrel is arranged in the region of the reference element, and, in the neutral location, the reference device being arranged outside a travel path of the measuring mandrel in such a way that the measuring mandrel can be introduced into the drilled hole to be measured without dipping through the reference element.

6. The measuring system according to claim 5, wherein movements of the reference device between the neutral location and the calibrating location and back are able to be carried out automatically with the aid of a drive which is provided for this purpose.

7. The measuring system according to claim 5, wherein the measuring system has a housing for receiving the reference device in the neutral location, the housing enclosing the reference device at least partially in the neutral location, and it being possible for the reference device to be moved out of the housing into the calibrating location.

8. The measuring system according to claim 7, wherein the reference device is guided in the manner of a drawer such that it can be moved in a linear manner into the housing and out of the housing.

9. The measuring system according to claim 7, wherein the housing is fastened to a main carrier.

10. The measuring system according to claim 5, wherein the reference device has a movably mounted load-bearing frame with receiving structures for receiving an exchangeable reference element carrier, the reference element carrier preferably being exchangeable without tools.

11. The measuring system according to claim 10, wherein the reference element carrier has receiving structures for receiving two or more reference elements in a coaxial arrangement.

12. The measuring system according to claim 5, wherein components of the measuring system are fastened to a load-bearing structure, the measuring unit being mounted on a slide which is guided on a linear guide system such that it can be displaced in a linear manner on a main carrier which is fastened to the load-bearing structure, the main carrier supporting the linear drive.

13. The measuring system according to claim 5, comprising an orientation system for the variable, reversible setting of the orientation of the measuring mandrel axis in relation to the load-bearing structure, the orientation system being configured for the independent setting of the location of the measuring mandrel axis along two translational axes which are perpendicular with respect to one another, and for the setting of the orientation of the measuring mandrel axis in relation to two rotational axes which are perpendicular with respect to one another.

14. The measuring system according to claim 13, wherein the orientation system has a first setting unit and a second setting unit which is separate from the first setting unit and is arranged at a spacing from the first setting unit, each of the setting units having first setting elements for the variable adjustment of a spacing between the load-bearing structure and the main carrier in a first direction, and second setting elements for the production of an variable relative movement of the main carrier with respect to the load-bearing structure in a second direction which is perpendicular with respect to the first direction.

15. The measuring system according to claim 14, wherein the two setting units are installed on a common main body.

16. A precision machine tool for the precision machining of a drilled hole in a workpiece, wherein the precision machine tool is assigned a measuring system according to claim 5.

\* \* \* \* \*